United States Patent
Larson et al.

(10) Patent No.: US 9,131,063 B2
(45) Date of Patent: Sep. 8, 2015

(54) DEVICES, METHODS, AND GRAPHICAL USER INTERFACES FOR PERFORMING ACTIONS RELATED TO SELECTED MESSAGES IN A MESSAGE IN-BOX AND FOR TRANSFERRING CALLS

(71) Applicant: RingCentral, Inc., San Mateo, CA (US)

(72) Inventors: Curt T. Larson, San Francisco, CA (US); Natasha Nayberg, San Carlos, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/797,614

(22) Filed: Mar. 12, 2013

(65) Prior Publication Data

US 2014/0149919 A1    May 29, 2014

Related U.S. Application Data

(60) Provisional application No. 61/730,014, filed on Nov. 26, 2012.

(51) Int. Cl.
| | |
|---|---|
| *G06F 3/0484* | (2013.01) |
| *H04M 1/725* | (2006.01) |
| *G06F 3/0488* | (2013.01) |
| *G06F 3/0482* | (2013.01) |

(52) U.S. Cl.
CPC ......... *H04M 1/72519* (2013.01); *G06F 3/0482* (2013.01); *G06F 3/0488* (2013.01); *G06F 3/04842* (2013.01); *G06F 3/04883* (2013.01); *G06F 3/04886* (2013.01)

(58) Field of Classification Search
CPC .................................................... G06F 3/0488
USPC .......................................................... 715/783
See application file for complete search history.

(56) References Cited

U.S. PATENT DOCUMENTS

| | | | | |
|---|---|---|---|---|
| 8,305,622 | B1 * | 11/2012 | Shmunis et al. | 358/1.15 |
| 8,433,797 | B2 * | 4/2013 | Vendrow et al. | 709/224 |
| 2009/0080029 | A1 * | 3/2009 | Vendrow et al. | 358/402 |
| 2010/0285777 | A1 * | 11/2010 | Golobrodsky et al. | 455/412.2 |
| 2011/0207484 | A1 * | 8/2011 | Karnam Holal et al. | 455/466 |
| 2012/0084710 | A1 * | 4/2012 | Sirpal et al. | 715/783 |
| 2012/0151357 | A1 * | 6/2012 | Roche et al. | 715/736 |
| 2013/0007150 | A1 * | 1/2013 | Hertz et al. | 709/206 |
| 2013/0018945 | A1 * | 1/2013 | Vendrow et al. | 709/203 |
| 2013/0067389 | A1 * | 3/2013 | Jin | 715/783 |
| 2013/0097244 | A1 * | 4/2013 | Manley et al. | 709/204 |

(Continued)

OTHER PUBLICATIONS iphone 4S—Oct. 2011.*
Microsoft Lync—2010.*

(Continued)

*Primary Examiner* — Steven Sax
*Assistant Examiner* — David Choi
(74) *Attorney, Agent, or Firm* — Finnegan, Henderson, Farabow, Garrett & Dunner LLP

(57) ABSTRACT

Telephonic computing devices having touch screen displays with new and improved methods and user interfaces for performing actions related to selected messages in a message in-box and for transferring calls, thereby increasing the effectiveness, efficiency, and user satisfaction with such devices. Such methods, devices, and interfaces may complement or replace existing methods, devices, and interfaces for performing actions related to selected messages in a message in-box and for transferring calls.

23 Claims, 10 Drawing Sheets

(56) References Cited

U.S. PATENT DOCUMENTS

2013/0216094 A1* 8/2013 DeLean .................. 382/103
2014/0149919 A1* 5/2014 Larson et al. ............. 715/783

OTHER PUBLICATIONS

Moving to Google Voice Mar. 11, 2009.*
Skype for Mac—Nov. 4, 2010.*

* cited by examiner

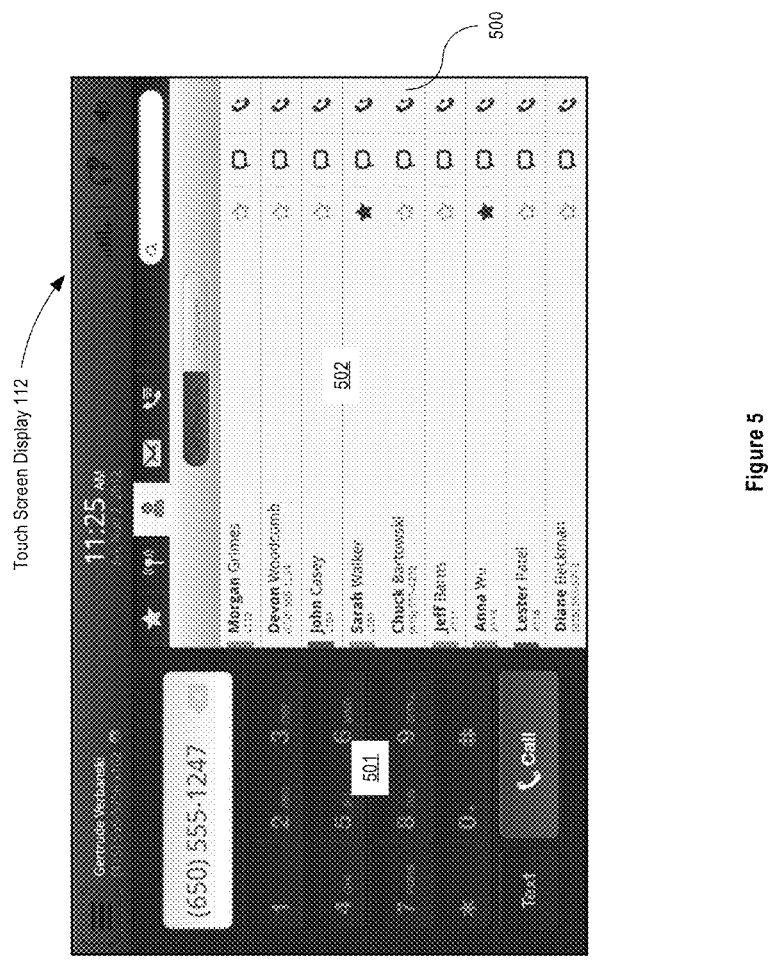

DEVICES, METHODS, AND GRAPHICAL USER INTERFACES FOR PERFORMING ACTIONS RELATED TO SELECTED MESSAGES IN A MESSAGE IN-BOX AND FOR TRANSFERRING CALLS

PRIORITY CLAIM

This application claims the benefit of U.S. Provisional Application No. 61/730,014, filed Nov. 26, 2012, the entire contents of which is hereby incorporated by reference as if fully set forth herein, under 35 U.S.C. §119(e).

TECHNICAL FIELD

The disclosed embodiments relate generally to telephonic computing devices with touch screen displays, and more particularly, to telephonic computing devices with touch screen displays that receive input for commanding various telephony application functions.

BACKGROUND

The use of touch screen displays as input devices for telephonic computing devices has increased significantly in recent years. Exemplary telephonic computing devices with touch screen displays include handheld tablet computing devices with cellular and/or wireless network capabilities and Internet Protocol (IP) desktop phones with touch screen displays. Such displays are used to manipulate user interface objects of telephony applications on the displays.

Exemplary manipulations include selecting a message in a message in-box and selecting a call transfer icon. A user may need to perform these and other manipulations on user interface objects in any telephony application where input is needed.

But existing methods for using such touch screen displays to perform certain telephony application functions are cumbersome and inefficient. For example, performing an action related to a selected message in a message in-box is tedious and creates a cognitive burden on a user. In addition, some conventional methods take longer than necessary to complete a task, thereby wasting the user's time and device's power reserve, which can be particularly important consideration for battery-operated devices.

SUMMARY OF SOME EMBODIMENTS

Accordingly, there is a need for telephonic computing devices with improved techniques and interfaces for performing actions related to selected messages in a message in-box and for transferring calls. Such techniques and interfaces may complement or replace conventional techniques and interfaces for performing actions related to selected messages in a message in-box and for transferring calls. Such techniques and interfaces reduce the cognitive burden on a user and produce a more efficient human-machine interface. For battery-operated devices, techniques and interfaces conserve power and increase the time between battery charges.

The above deficiencies and other problems associated with user interfaces for telephonic computing devices with touch screen displays are reduced or eliminated by the disclosed devices. In some embodiments, the telephonic computing device is a portable tablet computing device with cellular and/or wireless networking capabilities. In some embodiments, the telephonic computing device is a desktop Internet Protocol (IP) phone (also known as an "IP phone" or "VoIP phone") with a touch screen display. In some embodiments, the device has a graphical user interface (GUI), one or more processors, memory and one or more modules, programs, of sets of instructions stored in the memory for performing multiple telephony functions. In some embodiments, the user interacts with the GUI primarily though finger contacts and gestures on the touch screen display. In some embodiments, the telephony functions include answering incoming calls, viewing messages in a message in-box, transferring an active call, managing a contact list, and/or viewing the availability and/or status of a callee. Exemplary systems, methods, and computer program products for viewing messaging in a message in-box are described in related U.S. patent application Ser. No. 12/958,181, "Universal Call Management Platform," filed Dec. 1, 2010, the entire contents of which is hereby incorporated by reference. Exemplary systems, methods, and computer program products for viewing the availability and/or status of a callee are described in related U.S. patent application Ser. No. 13/442,488, "Cross-Platform Presence," filed Apr. 9, 2012, the entire contents of which is hereby incorporated by reference.

In some embodiments, a first method for performing an action related to a selected message in a message in-box is performed at a telephonic computing device with a touch screen display. The first method includes displaying a message panel having a plurality of message sub-panels on the touch screen display. Each sub-panel corresponds to one message in a message in-box of a user. The type of messages that may be represented by a message sub-panel include, but are not limited to, an incoming phone call message, an outgoing phone call message, an incoming text message, an outgoing text message, a voicemail message, an incoming fax message, and an outgoing fax message.

In some embodiments of the first method, first touch input on the touch screen display is detected. The first input selects a particular one of the plurality of message sub-panels. In response to detecting the first touch input, one or more selectable action regions are displayed on the particular message sub-panel. Prior to or in response to detecting the first touch input, a phone number associated with the message correspond to the particular message sub-panel is determined and the one or more selectable action regions to display on the particular message sub-panel are determined based, at least in part, on the determined phone number.

In some embodiments of the first method, each of the one or more selectable action regions displayed on the particular message sub-panel corresponds to a message action. The message actions include, but are not limited to, placing a phone call to the phone number associated with message corresponding to the particular message sub-panel, sending a text message to the phone number associated with message corresponding to the particular message sub-panel, viewing a contact list entry keyed by the phone number associated with message corresponding to the particular message sub-panel, adding a contact list entry keyed by the phone number associated with message corresponding to the particular message sub-panel, playing a voicemail message left by a caller from the phone number associated with message corresponding to the particular message sub-panel, and deleting the message corresponding to the particular message sub-panel from a message in-box in which the message is stored.

In some embodiments of the first method, second touch input on the touch screen display that selects a particular one of the one or more selectable action regions displayed on the particular message sub-panel is detected. In response to detecting the second touch input, the message action corresponding to the selected selectable action region is caused to occur.

In some embodiments, a second method for transferring a call is performed at a telephonic computing device with a touch screen display. The second method includes detecting first touch input on the touch screen display that selects an option to transfer an active call. In response to detecting the first touch input, a presence panel having a plurality of presence sub-panels is displayed on the touch screen display. Each presence sub-panel of the plurality of presence sub-panels represents one corresponding user being monitored. Each presence sub-panel of the plurality of presence sub-panels includes a visual indicator for the corresponding user being monitored. The visual indicator indicates at least one of a current availability or current status of the corresponding user being monitored. In some embodiments, the presence panel and sub-panels comprise of a list of contacts (e.g., all contacts, company contacts, personal contacts, favorites, frequently contacted, recently contacted, or specific contacts selected for presence monitoring) with corresponding availability or status information for each contact.

In some embodiments, the second method includes detecting second touch input on the touch screen display that selects a particular one of the plurality of presence sub-panels. In some embodiments, in response to detecting the second touch input, the second method includes initiating a cold or warm transfer of the active call to a phone number associated with the user being monitored corresponding to the particular presence sub-panel. In some embodiments, in response to detecting the second touch input, the second method includes allowing a user to select with touch input the option to initiate either a warm or cold transfer of the active call to a phone number associated with the user being monitored corresponding to the particular presence sub-panel.

Thus, telephonic computing devices with touch screen displays are provided with new and improved methods and user interfaces for performing actions related to selected messages in a message in-box and for transferring calls, thereby increasing the effectiveness, efficiency, and user satisfaction with such devices. Such methods, devices, and interfaces may complement or replace existing methods, devices, and interfaces for performing actions related to selected messages in a message in-box and for transferring calls.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 5 illustrates an exemplary user interface in accordance with some embodiments.

DESCRIPTION OF EMBODIMENTS

Introduction

Figure 1:
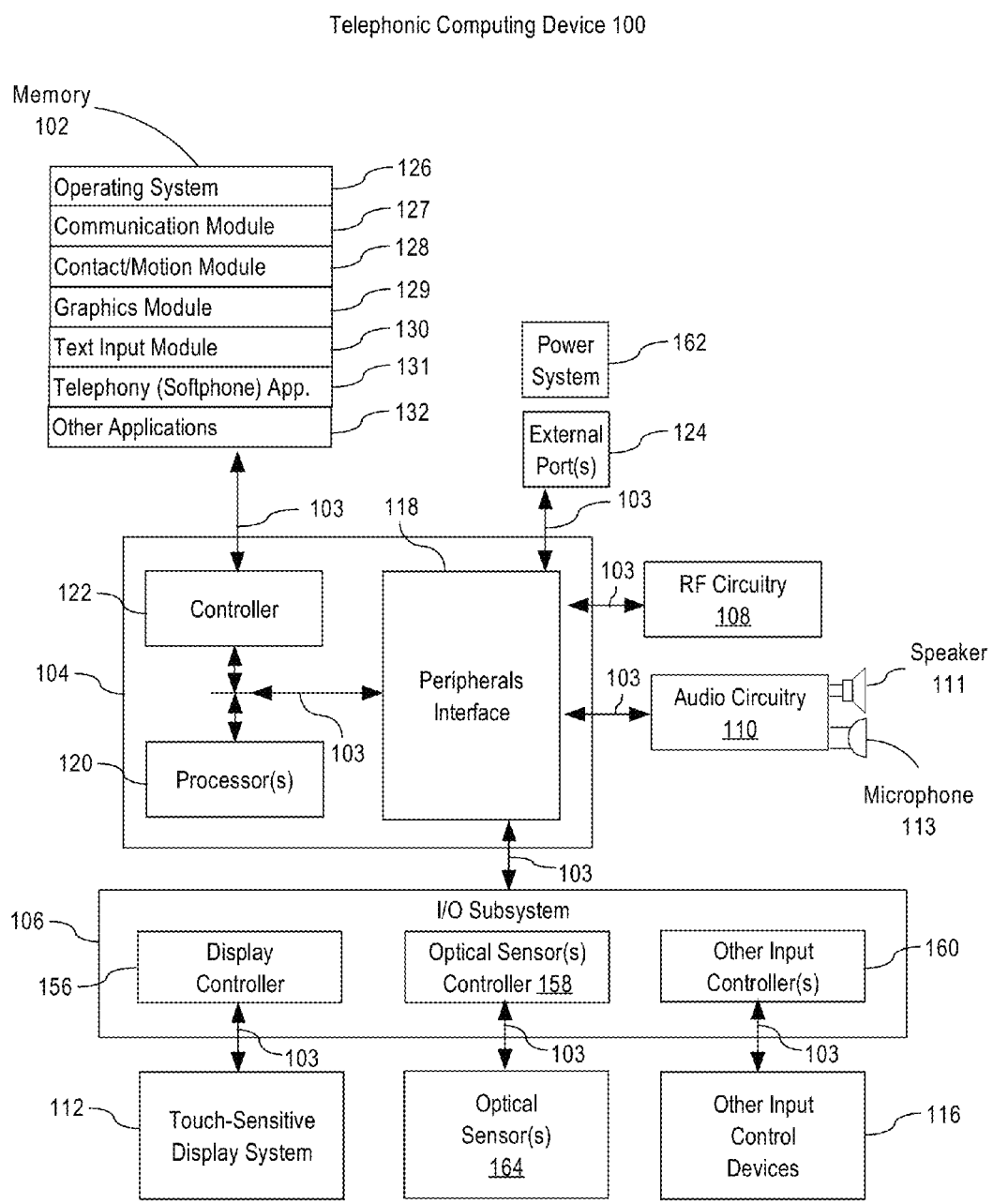
FIG. 1 is a block diagram of a telephonic computing device with a touch screen display, according to some embodiments of the invention.

The following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Exemplary Telephonic Computing Device

Techniques described herein for performing actions related to selected messages in a message in-box and for transferring calls may be embodied in a telephonic computing device. In some embodiments, the device is a portable computing device with telephony capabilities such as a tablet computer with telephony capabilities or smart phone device that may also contain other functions, such as PDA and/or music player functions. Exemplary embodiments of portable computing devices with telephony capabilities include, without limitation, the iPhone® and iPad® devices from Apple, Inc. of Cupertino, Calif. In some embodiments, the telephonic computing device is a stationary device such as a desktop VoIP phone. Exemplary embodiments of stationary devices include, without limitation, the Glass Phone® from CloudTC of Palo Alto, Calif.

In the above description of embodiments, a telephonic computing device that includes a touch screen display through which user input is provided is described. It should be understood, however, that the computing device may include one or more other physical user interface devices, such as a physical keyboard, a mouse and/or a joystick through which user input is provided in addition to or instead of user input provided through a touch screen display.

In some embodiments, the device supports one or more software programs that implement, use, or benefit from the techniques described herein for performing actions related to selected messages in a message in-box and for transferring calls. These software programs may include, but are not limited to, an operating system, a web browsing application, an e-mail application, and/or telephony application (also known as a "softphone application").

The various applications that may be executed on the device may use at least one common physical user interface device, such as the touch screen display. One or more functions of the touch screen display as well as corresponding information displayed on the device may be adjusted and/or varied from one application to the next and/or within a respective application. In this way, a common physical architecture (such as the touch screen display) of the device may support the variety of applications with user interfaces that are intuitive and transparent.

The user interfaces may include one or more soft or hard keyboard embodiments. Possible hard keyboard embodiments include Bluetooth keyboards or wired keyboards operatively coupled to the device. The soft keyboard embodiments may include standard (QWERTY) and/or non-standard configurations of symbols on the displayed icons of the keyboard. The soft keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards an embodiment of a telephonic computing device with a touch screen display. FIG. 1 is a block diagram illustrating a telephonic computing device 100 with a touch screen display 112 in accordance with some embodiments. The touch screen display 112. The device 100 may include a memory 102 (which may include one or more non-transitory computer readable mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a telephonic computing device 100, and that the device 100 may have more or fewer components than shown, may combine two or more components, or a may have a different configuration or arrangement of the components. The various components shown in FIG. 1 may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HS-DPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a handset jack (e.g., 206, FIG. 2). The handset jack provides an interface between the audio circuitry 110 and removable audio input/output peripherals, such as a handset (e.g., with both output (e.g., a speaker 111 for one ear) and input (e.g., a microphone 113).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113 or a menu and/or a back button. The one or more buttons may include a push button (e.g., 204, FIG. 2). A quick press of the push button may disengage a lock of the touch screen 112 or begin a process that uses gestures on the touch screen to unlock the device. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPad® from Apple Computer, Inc. of Cupertino, Calif. and the Glass Phone from CloudTC of Palo Alto, Calif.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a telephonic computing device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module software component (also called a camera module) stored in the memory 102, the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

In some embodiments, the software components stored in memory 102 may include an operating system 126, a communication module (or set of instructions) 127, a contact/motion module (or set of instructions) 128, a graphics module (or set of instructions) 129, a text input module (or set of instructions) 130, a telephony (softphone) application 131 (or set of instructions), and other applications (or sets of instructions) 134.

The operating system 126 (e.g., ANDROID, IOS, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 127 facilitates communication with other devices over one or more external ports 124 and also includes various software components for handling data received by the RF circuitry 108 and/or the external port(s) 124. The external port(s) 124 (e.g., Universal Serial Bus (USB), RJ-45 Ethernet, FIREWIRE, etc.) is adapted for coupling directly to other devices or indirectly over a network (e.g., the Internet, wireless LAN, etc.).

The contact/motion module 128 may detect contact with the touch screen 112 (in conjunction with the display controller 156) and other touch sensitive devices (e.g., a touchpad or physical click wheel). The contact/motion module 128 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 128 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 128 and the display controller 156 detects contact on a touchpad. In some embodiments, the contact/motion module 128 and the controller 160 detects contact on a click wheel.

The contact/motion module 128 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 129 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user interface objects including soft keys), digital images, videos, animations and the like.

In some embodiments, the graphics module 129 stores data representing graphics to be used. Each graphic may be assigned a corresponding code. The graphics module 129 receives, from applications etc., one or more codes specifying graphics to be displayed along with, if necessary, coordinate data and other graphic property data, and then generates screen image data to output to display controller 156.

The text input module 130, which may be a component of graphics module 130, provides soft keyboards for entering text in various software applications stored in memory 102 (e.g., contacts, e-mail, IM, browser, and any other application that needs text input).

The telephony (softphone) module 131 includes executable instructions for making phone calls, answering phone calls, conducting voice conversations or video conferences, receiving faxes, managing contacts, viewing messages in a message in-box, performing actions related to messages selected in the message in-box, viewing current activity and/or status information about a callee, transferring active phone calls, and other telephony functions. The telephony (softphone) modules 131 may use any of a plurality of standards, protocols, and technologies to carry out telephony and supporting functions including, without limitation, the Session Initiation Protocol (SIP) networking protocol; G.711 u-law and A-law, G.729A/B, and G.722 G.711 PLC voice codecs; G.168-2002 compliant full-duplex echo cancellation; Voice Activity Detection (VAD), Comfort Noise Generation (CNG), and Packet Loss and Concealment (PCL) call quality enhancement; DTMF TIA 464B and user defined tones; Real-Time Transport Protocol (RTP)/Real-Time Control Protocol (RTCP); the HyperText Transfer Protocol (HTTP) or the Secure HyperText Transfer Protocol (HTTPS) for sending and receiving supporting application data; or any other suitable standard, protocol, or technology including standards, protocols, and technologies not yet developed as of the filing date of this document.

Other applications 132 may include the following modules (or sets of instructions), or a subset or superset thereof:
- an e-mail client module;
- a web browser module;
- a word processing module;
- a spreadsheet module; and
- a text messaging module.

Examples of other applications 132 that may be stored in memory 102 include other word processing applications, other image editing applications, drawing applications, presentation applications, JAVA-enabled applications, encryption, digital rights management, voice recognition, and voice replication.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, some or the entire telephony module 131 may be part of the operating system 126. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112. By using a touch screen as the primary input/control device for operation of the device 100, the number of physical input/control devices (such as push buttons, dials, and the like) on the device 100 may be reduced.

Figure 2:
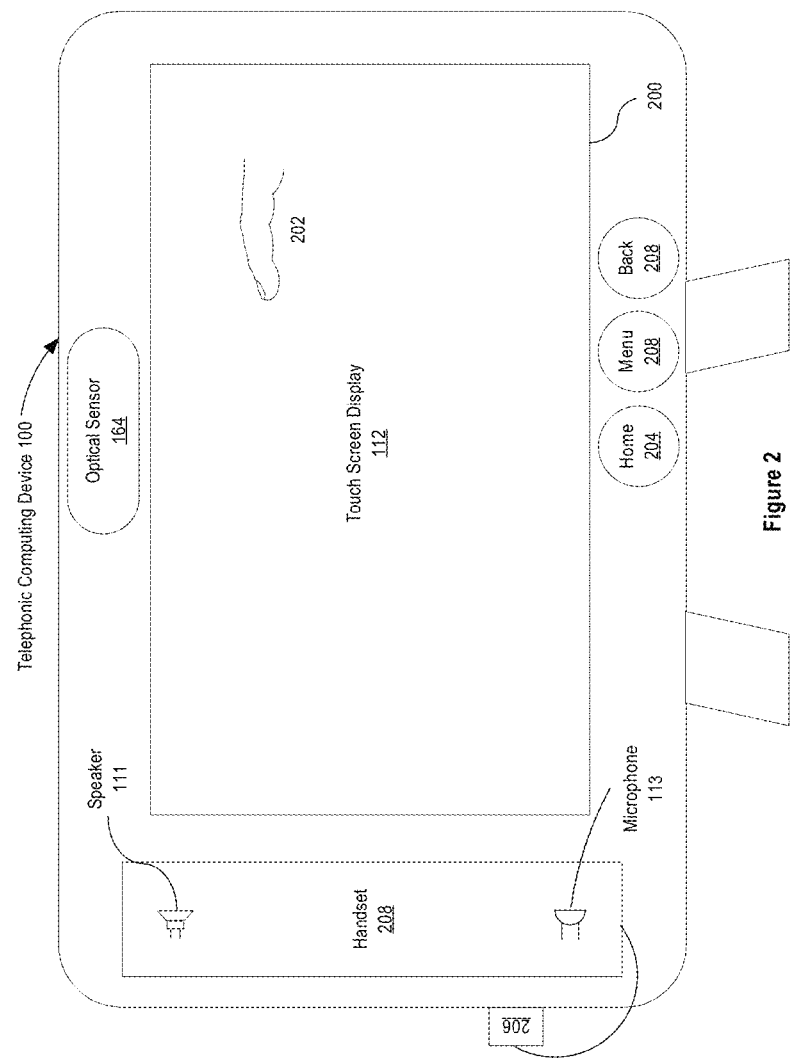
FIG. 2 illustrates a telephonic computing device having a touch screen display in accordance with some embodiments.

FIG. 2 illustrates a telephonic computing device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not shown). In some embodiments, selection of one or more graphics occurs when the user breaks contact with one or more graphics. In some embodiments, the contact may include a gesture, such as one or more taps, one or more swipes (from left to right, from right to left, upward and/or downward), and/or a rolling of a finger (from left to right, from right to left, upward and/or downward) that has made contact with device 100. In some embodiments, inadvertent contact with a graphic may not select the graphic. For example, a swipe gesture that sweeps of an application icon may not select the corresponding application icon when the gesture corresponding to selection is a tap.

The device 100 may also include one or more physical buttons, such as "home" or menu button 204. As described previously, the menu button 204 may be used to navigate to any application 131 or 132 in a set of applications that may be executed on the device 100. Alternatively, in some embodiments, the menu button is implemented as a soft key in a GUI in touch screen 112.

Attention is now directed towards exemplary embodiments of user interfaces ("UI") and associated processes that may be implemented on telephonic computing device 100.

Performing Actions Related to a Selected Message in a Message In-Box

Figure 3A:
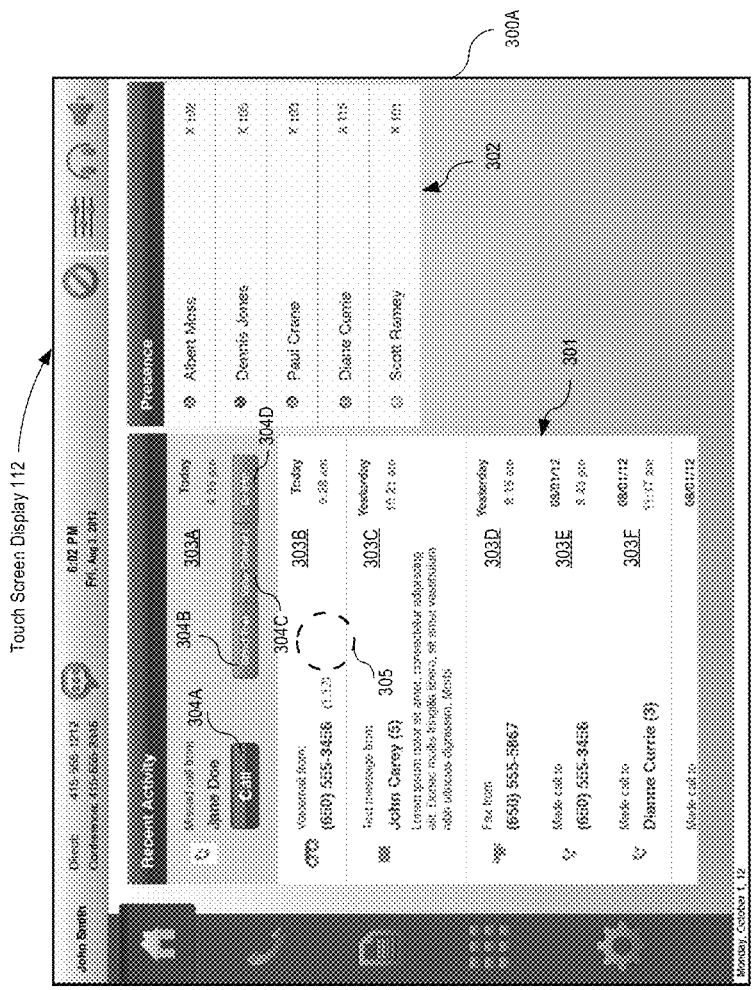
FIGS. 3A-3B illustrate exemplary user interfaces for performing actions related to selected messages in a message in-box on a telephonic computing device in accordance with some embodiments.
Figure 3B:
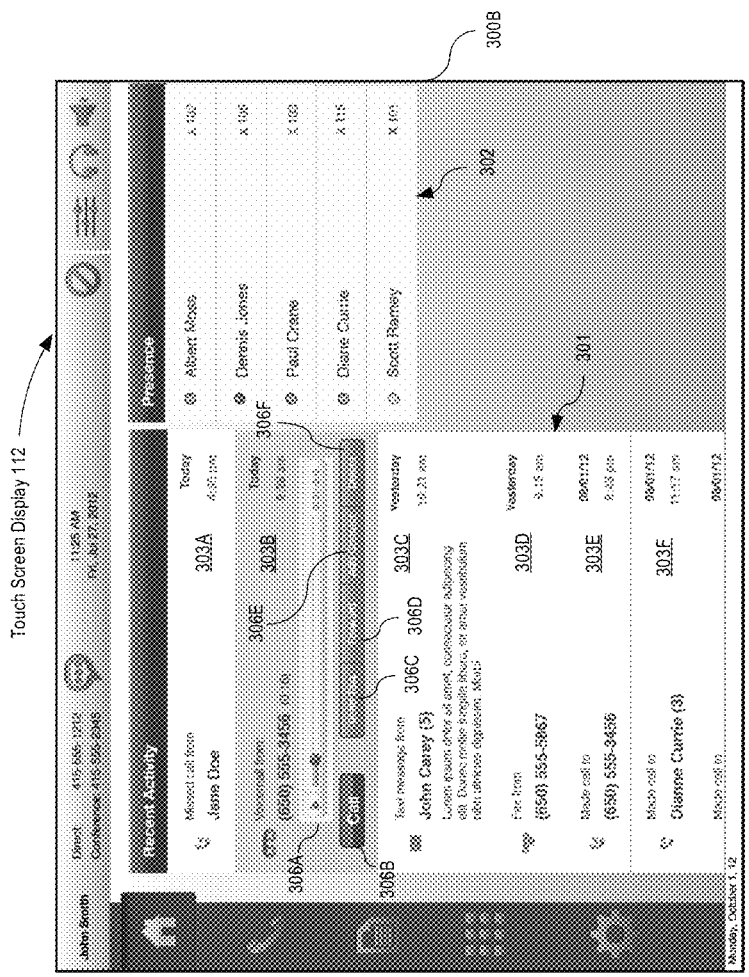
Figure 4A:
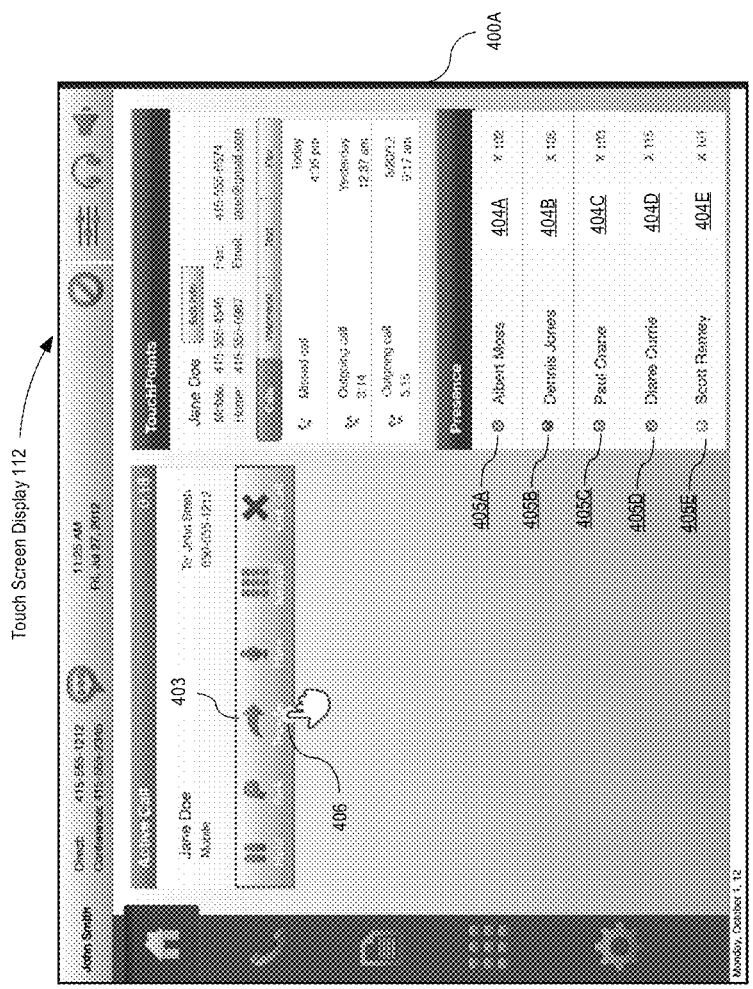
FIGS. 4A-4E illustrate exemplary user interfaces for transferring an active call in accordance with some embodiments.
Figure 4B:
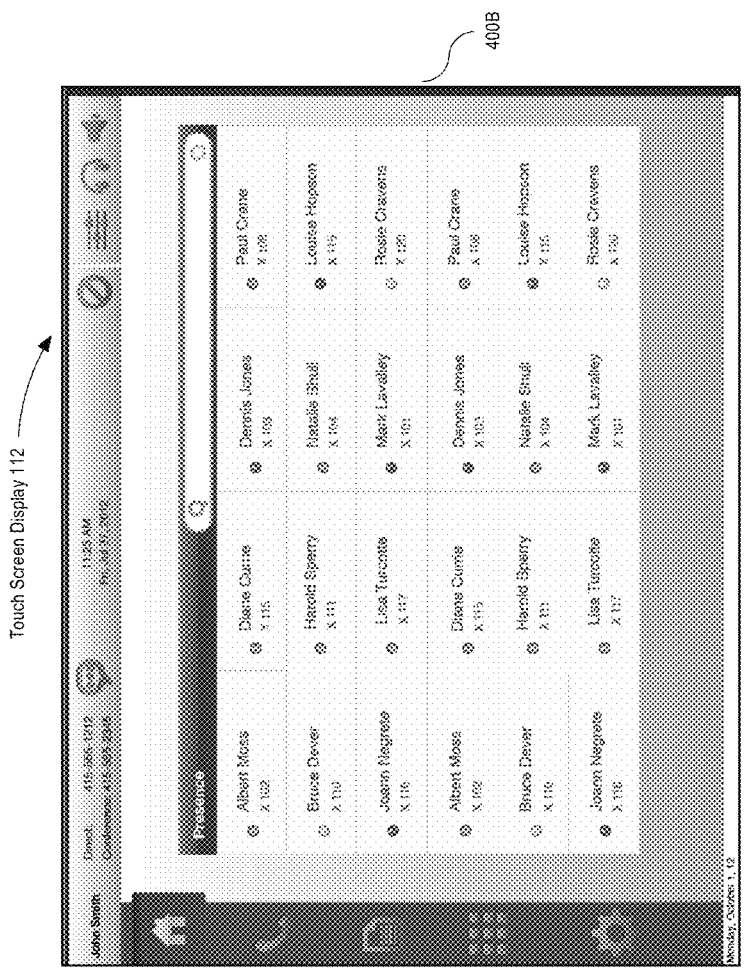
Figure 4C:
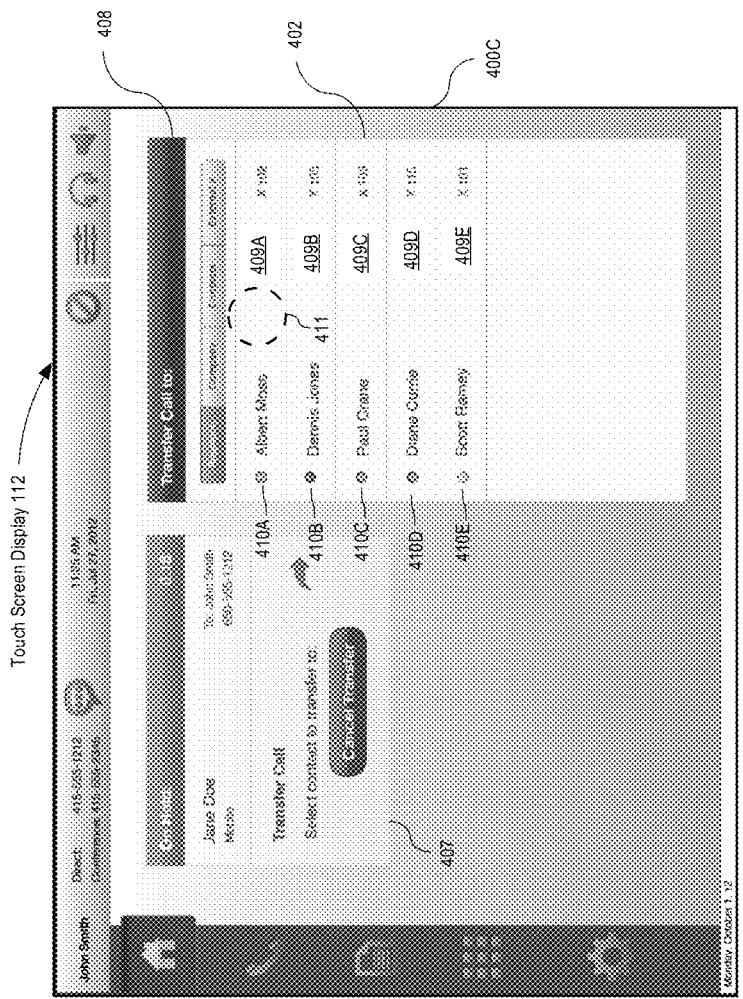
Figure 4D:
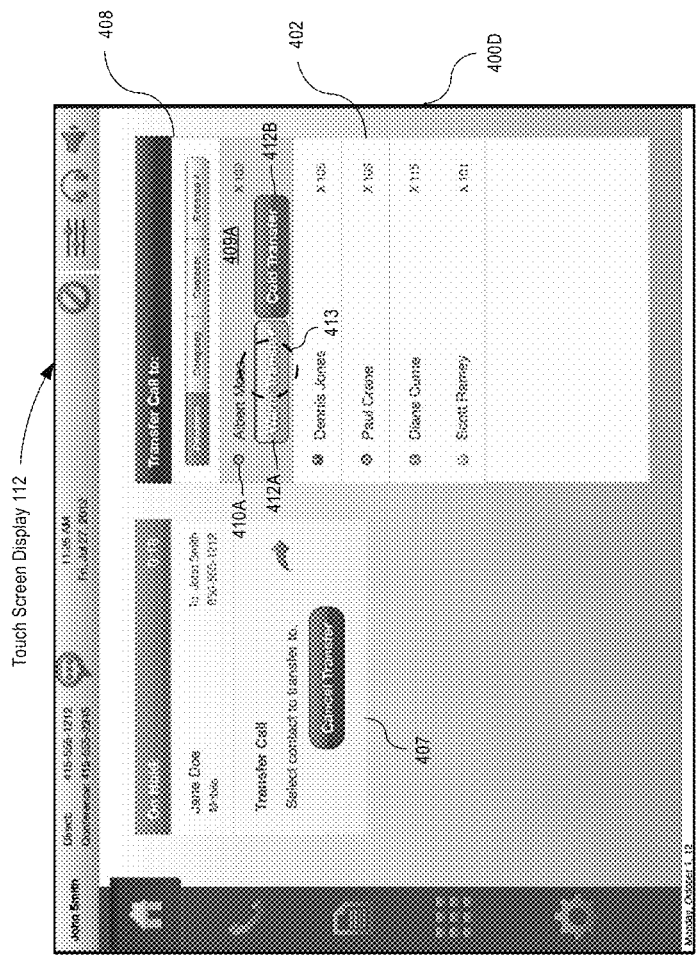
Figure 4E:
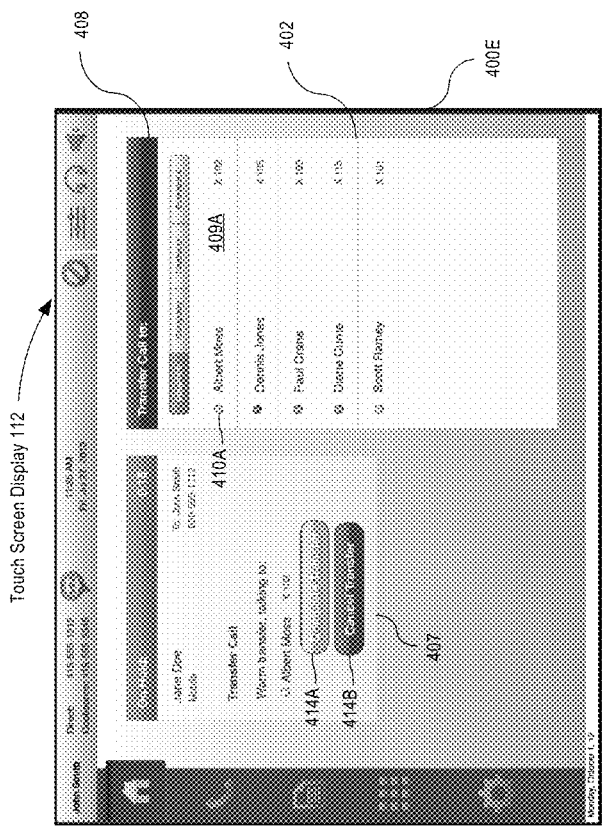

FIGS. 3A-3B illustrate exemplary user interfaces for performing actions related to a selected message in a message in-box of a user.

In FIGS. 3A-3B, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

UI 300A (FIG. 3A) is an exemplary user interface for a telephony application (e.g., telephony application 131) displayed on the touch screen 112 of device 100. In this example, the user interface 300A includes a message in-box panel 301 labeled "Recent Activity" and an other user availability and status monitoring panel 302 labeled "Presence". The message in-box panel 301 represents messages in a message in-box for a particular user (e.g., John Smith in this example). The messages in the message in-box may be stored on the device 100 and/or on one or more servers to which the device 100 is operatively coupled directly or indirectly (i.e., through one or more intermediate network devices) by one or more data networks. The presence panel 302 represents other users that the particular user is monitoring the availability and status of. The presence panel 302 is discussed in greater detail below with respect to transferring active calls.

In some embodiments, a soft keypad panel may be displayed beside the other panels. For example, selecting a contact to initiate a communication may result in the contact's number being entered into the keypad. Entering a contact's number into the keypad may result in the display or selection of the contact in the presence panel or another panel that displays contacts (e.g., panel displaying all contacts, company contacts, personal contacts, favorites, frequently contacted, or recently contacted). The keypad would also allow the user to select dual-tone multi-frequency signaling (DTMF) while the user is on a call, for example, to select phone menu options. In other embodiments, the keypad panel may not be displayed on the main screen of the device but may be displayed in response to a user selection. An exemplary user interface 500 showing a dialer keypad 501 beside a contacts panel 502 that may be displayed on the touch screen display 112 of device 100 is shown in FIG. 5.

The message in-box panel 301 includes a number of message sub-panels 303. In some embodiments, a message sub-panel 303 corresponds to an incoming call message (e.g., sub-panel 303A), a voicemail message (e.g., sub-panel 303B), an incoming text message (e.g., sub-panel 303C), an incoming fax message (e.g., sub-panel 303D), or an outgoing call (e.g., sub-panel 303E). In some embodiments, a message sub-panel 303 may also correspond to an outgoing text message and an outgoing fax message.

In some embodiments, the message sub-panels 303 are sorted by times associated with the messages represented by the message sub-panels 303. For example, in UI 300A, the message sub-panels 303 are presented on the message in-box panel 302 from top to bottom in ascending order of time differences between times associated with the messages and a current time. In some embodiments, the times associated with the messages correspond to times when activities associated with the messages occurred. The activities associated with the messages may vary depending on the type of message. As one example, the time associated with an incoming call message may be a time at which the incoming call was missed, a time at which the incoming call was answered (pick up), or a time at which the incoming call was disconnected (hung up). As another example, the time associated with an outgoing call message may be a time at which the outgoing call was initiated (placed) or a time at which at the outgoing call was disconnected (hung up). As another example, the time associated with a voicemail message may be a time at which the voicemail was recorded. As another example, the time associated with an incoming text message may be a time at which the text message was sent or received. As another example, the time associated with outgoing text message may be a time at which the text message was sent. As another example, the time associated with an incoming fax message may be a time at which the fax message was received. As another example, the time associated with an outgoing fax message may be a time at which the fax message was sent.

In some embodiments, a message sub-panel 303 represents multiple messages associated with the same phone number where each of the multiple messages are associated with a recent time relative to a current time. As an example, message sub-panel 303C represents five text messages associated with recent times sent from the same phone number associated with a John Carey. As another example, message sub-panel 303F represents three calls associated with recent times made from the same phone number to Dianne Currie. The recent time may be based on a predetermined threshold. For example, a message is considered recent if it is associated with a time within the past seven days. In some embodiments, the threshold for determining whether a message is recent enough is user configurable (e.g., via a settings or options menu).

In some embodiments, the message panel 302 has one currently selected sub-panel 303. In the example UI 300A, the currently selected sub-panel is sub-panel 303A. In some embodiments, the currently selected sub-panel is visually indicated. For example, in the example UI 300A, currently selected sub-panel 303A has a highlighted background. The highlighted background visually distinguishes the currently selected sub-panel 303A from the other displayed sub-panels 303B-303E that not currently selected.

In some embodiments, the currently selected message sub-panel contains one or more selectable action regions corresponding to message actions for the message represented by the currently selected message sub-panel. In the example UI 300A, currently selected sub-panel 303A contains selectable action regions 304A-D. Although in UI 300A, a selectable action region 304 is visually represented on the touch-screen display 112 as a button, a selectable action region is visually represented otherwise in other embodiments. For example, a selectable action region may be represented with an icon or graphic that represents the message action.

In some embodiments, the available message actions that can be invoked through corresponding selectable action regions presented on the currently selected message sub-panel depend on a phone number associated with the message represented by the currently selected message sub-panel. For example, in UI 300A, display of the selectable action region 304C corresponding to a view contact message action is dependent upon a phone number for Jane Doe associated with the message represented by sub-panel 303A being on a contact list. The contact list may be stored in memory of the device 100 and/or memory of one or more servers to which the device is operatively coupled directly or indirectly by one or more data networks. The selectable action region 304C, if activated by touch gesture (e.g., a tap gesture), causes display on the touch screen 112 of contact list information for the phone number of Jane Doe associated with the message represented by sub-panel 303A. Alternatively, if the contact list did not contain an entry for the phone number associated with the message represented by sub-panel 303A, then instead of displaying selectable action region 304C representing a view contact message action, a selectable action region 304 representing an add contact message action may be displayed.

Table 1 lists exemplary message actions in the left-most column. In the middle column, for each message action, a list of one or more message types for which the message action is applicable is specified. In the right-most column, a possible selectable action region that may be displayed on a message sub-panel representing a message of a message type specified in the middle column is described.

TABLE 1

Exemplary message actions, message types, and selectable action regions.

| Message Action | Message Type | Selectable Action Region |
| --- | --- | --- |
| Placing a phone call to the phone number associated with message corresponding to the selected message sub-panel. | Incoming call Outgoing call Voicemail message Incoming text | Display a "Call" selectable action region. |

TABLE 1-continued

Exemplary message actions, message types, and selectable action regions.

| Message Action | Message Type | Selectable Action Region |
| --- | --- | --- |
| | Message Outgoing text message. | |
| Send a text message to the phone number associated with message corresponding to the selected message sub-panel. | Incoming call Outgoing call Voicemail message Incoming text Message Outgoing text message | Display a "Send Text" selectable action region. |
| View a contact list entry keyed by the phone number associated with message corresponding to the selected message sub-panel. | Incoming call Outgoing call Voicemail message Incoming text Message Outgoing text message Incoming fax Message Outgoing Fax Message | Display a "View Contact" selectable action region if a contact list entry for the phone number is in the contact list. |
| Add a contact list entry keyed by the phone number associated with message corresponding to the particular message sub-panel. | Incoming call Outgoing call Voicemail message Incoming text Message Outgoing text message Incoming fax message Outgoing fax message | Display an "Add Contact" selectable action region if a contact list entry for the phone number is not in the contact list. |
| Play a voicemail message left by a caller from the phone number associated with message corresponding to the selected message sub-panel. | Voicemail message | Display a "voicemail player" selectable action region. |
| Deleting the message corresponding to the particular message sub-panel from a message in-box in which the message is stored. | Incoming call Outgoing call Voicemail message Incoming text message Outgoing text message Incoming fax message Outgoing fax message | Display a "Delete" selectable action region. The message in-box from which the message is deleted may be stored in memory of the device 100 and/or memory of one or more servers to which the device100 is operatively coupled by one or more data networks. In cases where the message is stored at the device 100 and on a server, the message may be deleted from one or both locations. |

The message actions, message types, and selectable action regions in Table 1 are merely exemplary. As mentioned, the set of selectable action regions that are displayed on a given message sub-panel may depend on a phone number associated with the message represented by the given message sub-panel.

In some embodiments, if a contact list entry keyed by the phone number exists in a contact list, then a "view contact" selectable action region is displayed on the message sub-panel (e.g., message sub-panel 303A of UI 300A (FIG. 3A)).

In some embodiments, if a contact list entry keyed by the phone number does not exist in a contact list, that an "add contact" selectable action region is displayed on the message sub-panel (e.g., message sub-panel 303B of UI 300B (FIG. 3B)).

In some embodiments, the order or arrangement of the selectable action regions as displayed on the given message sub-panel depends on the phone number or other contact information. For example, if preference information associated with the phone number indicates that the user associated with the phone number prefers to receive phone calls rather than text messages, then the "call" selectable action region may be displayed ahead of the "send text" selectable action region in a layout order of the selectable action regions (e.g., left-to-right, top-to-bottom, right-to-left, or bottom-to-top) on the given message sub-panel. Additionally or alternatively, the selectable action region corresponding to the preferred method of contact may be visually distinguished (i.e., highlighted) from selectable action regions corresponding to less preferred methods of contact. The preference information may be stored in memory of the device 100 and/or in memory of one or more servers to which the device 100 is operatively coupled. Additionally or alternatively, if presence information associated with the phone number indicates that the user associated with the phone number is currently on the telephone or otherwise busy, action regions corresponding to asynchronous communications, such as "send text", "send voicemail", or "send fax" selectable action regions may be displayed ahead of and/or visually distinguished from the "call" selectable action region on the given message sub-panel.

In some embodiments, a "call" selectable action region is not displayed on the given message sub-panel based on authorization information that specifies that the user is not authorized to place phone calls to the phone number associated with the message represented by the given message sub-panel. In some embodiments, a "send text" selectable action region is not displayed on the given message sub-panel based on authorization information that specifies that the user is not authorized to send text messages to the phone number associated with the message represented by the given message sub-panel. The authorization information may be stored in memory of the device 100 and/or in memory of one or more servers to which the device 100 is operatively coupled.

Referring again to the UI 300A of FIG. 3A, it illustrates a touch contact 305 on the touch screen 112. In this example, the contact 305 is at a location on the touch screen 112 corresponding to the location of message sub-panel 303B.

UI 300B (FIG. 3A) illustrates that, in response to touch contact 305, message sub-panel 303B is now the currently selected message sub-panel. In the example UI 300B, selectable action regions 306A-306F are displayed on the message sub-panel 303B. Selectable action region 306A is a "voicemail "player" selectable action region for playing back the voicemail message (e.g., audibly outputting the voicemail message from a speaker of the device 100). Selectable action region 306B is a "call" selectable action region for placing a call to the phone number associated with the voicemail message. Selectable action region 306C is a "send text" selectable action region for sending a text message to the phone number associated with the voicemail message. Selectable action region 306D is a "forward voicemail message" selectable action region for forwarding the voicemail message to another user's message in-box. Display of the selectable action region 306E corresponding to an "add contact" message action is dependent upon the phone number associated with the voicemail message represented by sub-panel 303B not being on a contact list. The contact list may be stored in memory of the device 100 and/or memory of one or more servers to which the device is operatively coupled directly or indirectly by one or more data networks. In some embodiments, the selectable action region 304E, if activated by touch gesture (e.g., a tap gesture), causes display on the touch screen 112 of a user interface form for adding contact list information for the phone number associated with the message represented by sub-panel 303A to the contact list. Alternatively, if the contact list did contain an entry for the phone number associated with the message represented by sub-panel 303B, then instead of displaying selectable action region 304E representing an add contact message action, a selectable action region 304 representing an view contact message action may be displayed. Selectable action region 306F is a "delete message" selectable action region for deleting the voicemail message.

Beneficially, by determining which selectable action regions to display on a given message sub-panel based on a phone number associated with the message represented by the message sub-panel, a more intuitive user interface for performing actions related to selected messages in a message in-box is provided to the user, thereby increasing the effectiveness, efficiency, and user satisfaction with such user interfaces.

Transferring Active Calls with Presence Feature

FIGS. 4A-4E illustrate exemplary user interfaces for transferring an active call to a transferee in a way in which the transferor is informed about the current availability and status of the transferee.

In FIGS. 4A-4E, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

UI 400A (FIG. 4A) is an exemplary user interface for a telephony application (e.g., telephony application 131) displayed on the touch screen 112 of device 100. In this example, the user interface 400A includes an active call panel 401 labeled "Active Call" and a user availability and status monitoring panel 402 labeled "Presence" (hereinafter referred to as a "presence panel"). The active call panel 401 represents an active phone call from Jane Doe to John Smith. The active call panel 401 includes a selectable region 403 for transferring the active call from the transferor (John Smith in this example) to a transferee.

The presence panel 402 includes a plurality of presence sub-panels 404 corresponding to a plurality of users that the transferor has previously selected to monitor the availability and status of. Each sub-panel 404 has an availability and status indicator 405 that indicates the current availability and status of the user named on the corresponding sub-panel 404. In some embodiments, the presence panel 402 is internally scrollable if the list of users being monitoring is large. In other embodiments, to accommodate a large list of users being monitored, presence sub-panels are arranged in a grid arrangement such as shown in UI 400B of FIG. 4B. When presenting presence sub-panels in a grid arrangement, the presence panel may still be internally scrollable if the number of users being monitoring is large.

Techniques for determining the current availability and status of monitored users are described in related U.S. patent application Ser. No. 13/442,488, "Cross-Platform Presence," filed Apr. 9, 2012, the entire contents of which is hereby incorporated by reference. Generally, the techniques involve a service provider monitoring inbound and outbound network connections for communication devices used by the monitored users to determine devices statuses for the communication devices. Current availability and statuses are determined for monitored users based on aggregates of the communication device statutes. The current availability and status of a monitored user may be indicated on a presence sub-panel in a number of different ways. In some embodiments as exemplified in UI 400A, the current availability and status is indicated with a graphical representation of a light emitting diode (LED). To visually convey different current availabilities and statuses the LED representation may be different colors, may blink, or may visually exhibit a combination of color and blinking. For example, a blinking LED representation may indicate that the corresponding monitored user is currently on an active call. As another example, greed colored LED representation may indicate that the monitored user is likely available. As another example, a yellow colored LED representation may indicate that the monitored user is busy. In addition to or instead of a LED representation, a textual indicator may be displayed on a presence sub-panel to indicate the current availability and status of the corresponding monitored user. Example textual indicators include, but are not limited to, "one the phone", "do not disturb", "unavailable", "busy", "out-of-office", "away from desk", "at home", "mobile", 'traveling", "unavailable", and "busy".

The current availability and status of monitored users as indicated on presence sub-panels can be used by the transferor to determine whether an active call should be transferred to one of the monitored users. For example, in a business setting, if an assistant to a manger considers whether to transfer an incoming call to the manager, it is useful to the assistant to understand the current availability and status of the manager. A presence sub-panel for the manager with a current availability and status indicator can be used by the assistant to determine whether to transfer the incoming call to the manager without requiring the assistant to call, walk to, or instant message the manager.

Referring again to UI 400A (FIG. 4A), it illustrates a touch contact 406 (e.g., a tap gesture) on the touch screen 112. In this example, the contact 406 is at a location on the touch screen 112 corresponding to the location of selectable region 403 for transferring the active call.

UI 400C (FIG. 4C) illustrates that, in response to touch input 406 (UI 400A), the touch screen display 112 now displays an on-hold panel 407 and a transferee selection panel 408. The transferee selection panel 408 can display different sub-panels including presence panel 402. Presence panel 402 shows a plurality of presence sub-panels 409A-409E corresponding to a plurality of users being monitored by the transferor. Each presence sub-panel 409 also includes a current availability and status indicator 410 indicating the current availability and status of the corresponding monitored user as described above. In addition, each presence sub-panel 409 is selectable by touch input directed to a location on the touch screen 112 corresponding the location of the presence sub-panel 409 on the touch screen. For example, UI 400C (FIG. 4C) illustrates a touch contact 411 (e.g., a tap gesture) on the touch screen 112. In this example, the contact 411 is at a location on the touch screen 112 corresponding to the location of selectable presence sub-panel 409A for selecting the monitored user "Albert Moss" at extension "102" as the transferee.

UI 400D (FIG. 4D) illustrates that, in response to touch input 411, presence sub-panel 409A becomes the currently selected presence sub-panel and provides a selectable option 412A to make a warm transfer to the transferee at extension "102" and a selectable option 412B to make a cold transfer to the transferee at extension "102". In another embodiment, in response to touch input 411, a warm or cold transfer to the selected transferee is directly initiated, bypassing the option to select one or the other kind of transfer. In some embodiments, upon initiating a warm transfer, the transferor is connected to the transferee's phone number providing an opportunity for the transferor to explain the call transfer to the transferee before the call transfer is completed and the transferor disconnected. In some embodiments, upon initiation of a cold transfer, the transferor is immediately disconnected.

In the example UI 400D, a touch contact 413 on the touch screen 112 is illustrated. The contact 413 is at a location on the touch screen 112 corresponding to the location of the warm transfer option 412A on the touch screen 112 for performing a warm transfer of the active call.

UI 400E (FIG. 4E) illustrates that, in response to touch input 413, the on-hold panel 407 indicates that the transferor is connected to the transferee in accordance with the warm transfer operation. The transferor can complete the transfer with touch input to selectable option 414A or cancel the transfer with touch input to selectable option 414B. The current availability and status indicator 410A has changed from "available" to "busy" reflecting that the transferee's phone at extension "102" is currently connected to the device 100 as part of the warm transfer operation.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method for a telephonic computing device with a display, the method comprising;
    displaying, on the display, a message panel including a plurality of message sub-panels;
    wherein each message sub-panel of the plurality of message sub-panels corresponds to a type of message;
    based at least in part on the type of message that a first message sub-panel of the plurality of message sub-panels corresponds to, selecting a first set of a plurality of selectable action regions to display on the first message sub-panel, wherein the first message sub-panel is associated with a phone number and the first set of selectable action regions reflects a message action for placing a phone call to the phone number associated with the first message sub-panel and a message action for sending a text message to the phone number associated with the first message sub-panel;
    obtaining presence information associated with the phone number;
    determining an order for the plurality of selectable action regions for display on the first message sub-panel based on the presence information associated with the phone number;
    displaying at least the first set of selectable action regions on the first message sub-panel in the determined order, wherein when the presence information associated with the phone number indicates that a user associated with the phone number is busy, then the selectable action region reflecting the message action for sending a text is displayed ahead of the selectable action region reflecting the message action for placing a phone call;

receiving a selection of a particular one of the plurality of selectable action regions displayed on the first message sub-panel; and causing a message action corresponding to the selected selectable action region.

2. The method of claim 1, wherein each sub-panel of the plurality of message sub-panels corresponds to one of the following message types:
- an incoming phone call,
- an outgoing phone call,
- an incoming text message, an outgoing text message, a voicemail message,
- an incoming fax message, or an outgoing fax message.

3. The method of claim 1, wherein each of the plurality of selectable action regions displayed on the first message sub-panel corresponds to one of the following message actions:
- placing a phone call to the phone number,
- sending a text message to the phone number,
- displaying a contact list entry keyed by the phone number,
- adding a contact list entry keyed by the phone number,
- playing a voicemail message left by a caller from the phone number, or
- deleting a message or messages corresponding to the first message sub-panel from a message in-box in which the message or messages are stored.

4. The method of claim 1, wherein at least one of the message sub-panels corresponds to multiple messages associated with the same phone number.

5. The method of claim 1, wherein the first message sub-panel corresponds to an incoming phone call.

6. The method of claim 1, wherein the first message sub-panel corresponds to an outgoing phone call.

7. The method of claim 1, wherein the first message sub-panel corresponds to an incoming text message.

8. The method of claim 1, wherein the first message sub-panel corresponds to an outgoing text message.

9. The method of claim 1, wherein the first message sub-panel corresponds to a voicemail message.

10. The method of claim 1, wherein the first message sub-panel corresponds to an incoming fax message.

11. The method of claim 1, wherein the first message sub-panel corresponds to an outgoing fax message.

12. The method of claim 1, wherein the message action corresponding to the selected selectable action region is presenting a contact list entry keyed by the phone number associated with the first message sub-panel.

13. The method of claim 1, wherein the message action corresponding to the selected selectable action region is adding a contact list entry keyed by the phone number associated with the first message sub-panel.

14. The method of claim 1, wherein the message action corresponding to the selected selectable action region is playing a voicemail message left by a caller from the phone number associated with the first message sub-panel.

15. The method of claim 1, wherein the message action corresponding to the selected selectable action region is deleting a message or messages corresponding to the first message sub-panel from a message in-box in which the message or messages are stored.

16. A telephonic computing device, comprising:
a display;
one or more processors;
one or more non-transitory computer-readable media storing instructions which, when executed by the one or more processors, cause performance of a method comprising:

displaying, on the display, a message panel including a plurality of message sub-panels;

wherein each message sub-panel of the plurality of message sub-panels corresponds to a type of message;

based at least in part on the type of message that a first message sub-panel of the plurality of message sub-panels corresponds to, selecting a first set of a plurality of selectable action regions to display on the first message sub-panel, wherein the first message sub-panel is associated with a phone number and the first set of selectable action regions reflect a message action for placing a phone call to the phone number associated with the first message sub-panel and a message action for sending a text message to the phone number associated with the first message sub-panel;

obtaining presence information associated with the phone number;

determining an order for the plurality of selectable action regions for display on the first message sub-panel based on the presence information associated with the phone number;

displaying at least the first set of selectable action regions on the first message sub-panel in the determined order, wherein when the presence information associated with the phone number indicates that a user associated with the phone number is available, then the selectable action region reflecting the message action for placing a phone call is displayed ahead of the selectable action region reflecting the message action for sending a text;

receiving a selection of a particular one of the plurality of selectable action regions displayed on the first message sub-panel; and causing a message action corresponding to the selected selectable action region.

17. The device of claim 16, wherein each sub-panel of the plurality of message sub-panels corresponds to one of the following message types:
- an incoming phone call,
- an outgoing phone call,
- an incoming text message,
- an outgoing text message,
- a voicemail message,
- an incoming fax message, or
- an outgoing fax message.

18. The device of claim 16, wherein each of the plurality of selectable action regions displayed on the first message sub-panel corresponds to one of the following message actions:
- placing a phone call to the phone number,
- sending a text message to the phone number,
- displaying a contact list entry keyed by the phone number,
- adding a contact list entry keyed by the phone number,
- playing a voicemail message left by a caller from the phone number, or
- deleting a message or messages corresponding to the first message sub-panel from a message box in which the message or messages are stored.

19. The device of claim 16, wherein at least one of the message sub-panels corresponds to multiple messages associated with the same phone number.

20. The method of claim 1, wherein each message sub-panel of the plurality of message sub-panels corresponds to a different type of message.

21. The method of claim 1, wherein displaying at least the first set of plurality of selectable action regions on the first message sub-panel comprises visually distinguishing at least one of the first set of plurality of selectable action regions based at least in part on the presence information associated with the phone number.

22. The method of claim 1, further comprising:
based at least in part on the type of message that a second message sub-panel of the plurality of message sub-panels corresponds to, selecting a second set of one or more selectable action regions to display on the second message sub-panel;
displaying at least the second set of one or more selectable action regions on the second message sub-panel; and
wherein the first set of plurality of selectable action regions is different than the second set of one or more selectable action regions.

23. The method of claim 1, further comprising:
concurrently displaying a) the presence information and b) at least the first set of plurality of selectable action regions on the first message sub-panel.

\* \* \* \* \*